Figure 1:
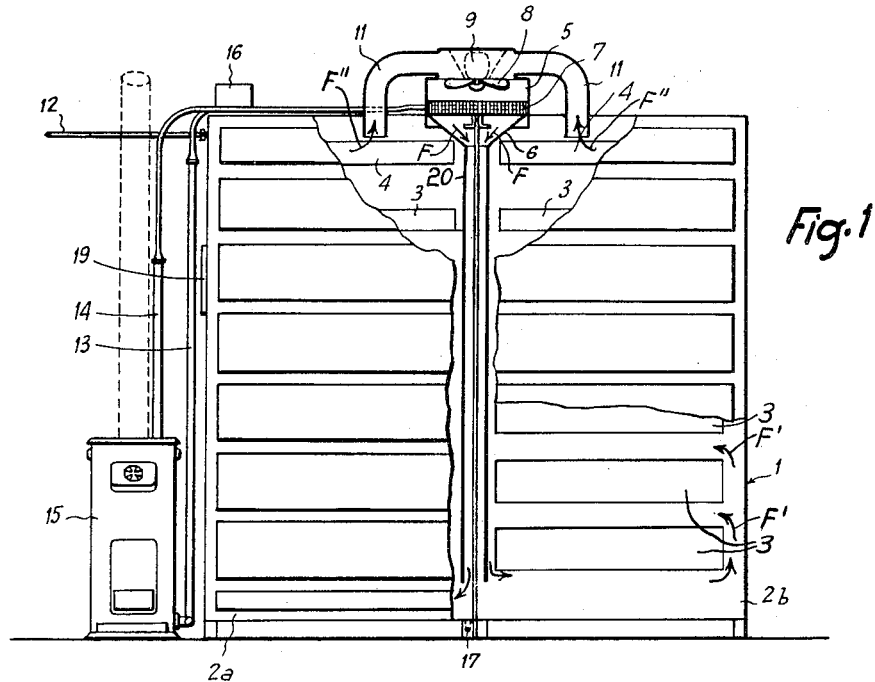

Dec. 6, 1955  G. PERIN  2,725,673
METHOD AND APPARATUS FOR SOILLESS PLANT CULTIVATION
Filed April 3, 1951

Inventor:
GASTON PERIN
By
Attorney

United States Patent Office 2,725,673
Patented Dec. 6, 1955

2,725,673
METHOD AND APPARATUS FOR SOILLESS PLANT CULTIVATION

Gaston Perin, Paris, France

Application April 3, 1951, Serial No. 219,002

Claims priority, application Belgium April 3, 1950

3 Claims. (Cl. 47—1.2)

This invention relates to the soilless or activated cultivation of plants. In the so-called soilless or activated culture of plants, cabinets provided with suitable heating means adapted to maintain within the cabinets a temperature favourable for the germination and growth of the plants have been used. In cultivating apparatus of this kind, trays or baskets are disposed in stacked relationship within a cabinet and contain the seeds of the plants that are to germinate in an appropriate soilless medium, a burner or other suitable heating means being arranged in the base of the cabinet. This arrangement does not, however, result in a uniform distribution of the temperature throughout the height of the cabinet.

In another connection, it has been found that the growth of plants in a soilless culture medium is enhanced if the plants are maintained in a slightly pressurized atmospheric medium in which the concentration of $CO_2$ and/or other combustion gases is increased.

It is a first object of the invention to provide a method and means for obtaining a more uniform temperature distribution in the soilless cultivation of plants. Another object is to provide a method and means for maintaining the plants in an adjustably pressurized atmospheric medium having an increased and controllable content of $CO_2$ and/or other suitable growth-promoting gases, at a uniform temperature.

A further object of the invention is to maintain in a cabinet or similar apparatus for soilless cultivation a slight superatmospheric pressure of air having a relatively high $CO_2$ (or other suitable gas) content, and at the same time create and maintain throughout the cabinet an intense circulation which is effective to maintain a uniform temperature distribution therein, preventing the inception of mould and promoting the respiration of the plants and maintaining optimum hygrometric conditions therefor.

Thus, by way of indication, it is advantageous to provide a relative gauge pressure of 1.3 atmospheres, and a suitable composition for the gaseous atmosphere may be given as consisting of about 8% $CO_2$ and 92% air at a hygrometric index equal to 100.

In one embodiment of the invention, the air may be heated by causing it to flow through or over a heating element such as a heat exchanger or radiator, and then the heated air is delivered in the form of a blast from a blower fan or the like into a conduit delivering it into the top of the cabinet above the tank provided therein for the humidifying water supply. The air issues from the base of the cabinet after having flowed down it past the various seed-containing trays therein, through an outlet orifice somewhat smaller in flow section than the delivery conduit, so as to create and maintain a suitable slight superatmospheric pressure within the cabinet.

The heat-exchanger is desirably heated by the circulation of the combustion gases from a burner, said gases being allowed to collect in a chamber, whence they are drawn to be mixed with the hot air discharged by the fan into the cabinet.

In a preferred embodiment of the invention, the said fan is housed in an enclosure provided with a fresh-air intake valve, a gas-intake conduit delivering the combustion gases, including carbonic acid gas, from the burner into the enclosure, and a delivery conduit discharging the heated gaseous mixture including air and the combustion gases from the enclosure into the top of the cabinet, while a return pipe is provided leading from the bottom of the cabinet back into the enclosure, whereby the heated and $CO_2$ enriched air may be recycled.

Figure 2:
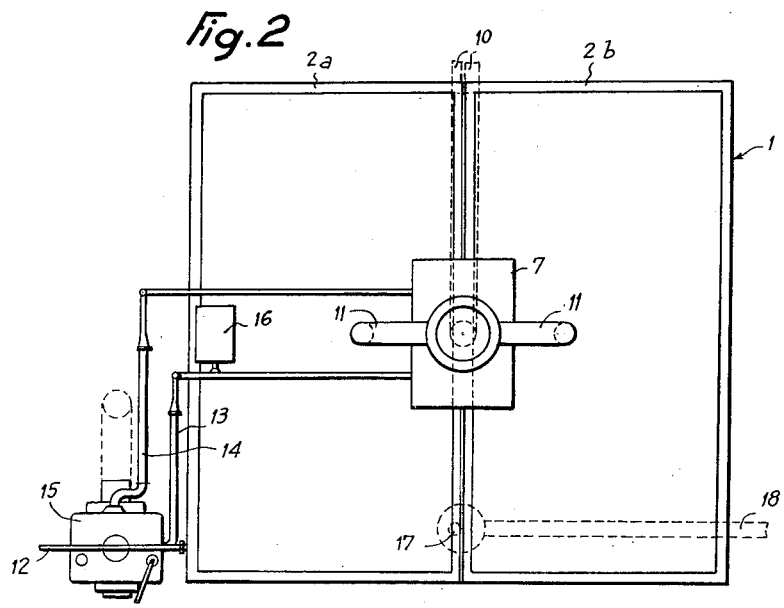

The above and other objects, features and advantages will appear more fully from the following description of one nonlimitative embodiment of apparatus according to my invention, illustrated in the accompanying diagrammatic drawings, in which:

Fig. 1 is a schematic elevation, partly in cross-section, of the equipment according to the invention; and Fig. 2 is a top plan view of the same.

As shown, the cabinet 1 is composed of two identical sides 2a and 2b in each of which is disposed a stack of trays or baskets 3 containing a soilless cultivating medium in which the seeds are placed to germinate. Above the topmost tray in each stack is a tank 4 containing a supply of humidifying water. An enclosure 5 is mounted on the top of the cabinet 1 and is provided with a downwardly depending funnel 6 separated from the enclosure 5 by a radiator or heat exchanger 7 above which is disposed a fan 8. The fan 8 draws air from the upper part 9 which communicates with fresh air intakes 10 and with two conduits 11, the openings of which are disposed above the tanks 4. The tanks 4 are filled by a water supply pipe 12 and the heat exchanger 7 is heated by the hot combustion gases delivered by the conduit 14 connected to the flue of the burner or stove 15. Suitable openings are provided in the portion of the heat exchanger through which the combustion gases pass so that such gas can escape and be mixed with the recirculated gases flowing through the exchanger under the influence of the fan 8. A conduit 20 extends from the funnel 6 and opens adjacent the bottom of cabinet 1 to there discharge the heated and $CO_2$ rich air which then circulates upwardly, as indicated by the arrows F', through and around the successive trays 3.

The gases after having circulated from the bottom towards the top of the cabinet 1, enter the conduits 11 and flow through conduit 13 into the bottom of the burner 15. A closed cycle is thus obtained for the circulation of the gases, said circulation being regulated by a control valve 16. According to a characteristic of the present invention, the conduit 13 has a smaller flow section than the conduit 14 whereby a slight overpressure is created within the cabinet 1. Spent water is discharged through tube 17 into the drain 18.

In the above described arrangement, there is obtained a hot air circulation which is favorable to a uniform temperature distribution throughout the cabinet 1. A thermostat 19 is preferably associated with the cabinet 1 to control the operation of the fan 8 by known means (not shown).

In operation, it will be readily understood that when the fan 8 is operated, a continuous circulation of air is created down cabinet 1 in the direction of the arrows and back through return conduit 11 and that a constant over-pressure prevails in the cabinet; when the stove or burner 15 is fired, this air is heated by heat exchange with the combustion gases in heat exchanger 7, and moreover, the air blast has a predetermined amount of combustion gases including carbonic gas mixed with it. The fresh-air intake valve 16 is suitably adjusted to add a requisite amount of make-up fresh air into the recycled gas mixture. Thus in this arrangement the relatively cooler fresh air is introduced centrally of the upper part of the chamber and is mechanically forced down by the fan through the central channel between the trays after first passing through the humidifying zone, and the air ascends back up along the sides, thus providing a constant absorption at all times and at all points in the chamber.

It will be understood that the relative disposition and the structural details of the component parts of the installation may be altered in any number of ways within the scope of the invention. Thus the enclosure 5, instead of being separate from the cabinet as shown, may be incorporated therein, preferably at the top of the cabinet. All such modified arrangements which do not alter the basic flowsheet and operating principle of the invention should be construed as comprised in the scope defined by the ensuing claims.

I claim:

1. A method for accelerating the germination of seeds comprising the steps of disposing the seeds in superposed receptacles within a closed container, feeding the seeds periodically with a liquid nutrient, maintaining a constant circulation of a gas charged with carbon dioxide at a uniform elevated temperature from top to bottom at the center of the closed container and from bottom to top at the periphery of said container in a zone encircling said receptacles so that the gas is conveyed into uniform contact with the seeds in the several superposed receptacles.

2. Apparatus for the acclerated germination of seeds; comprising a closed container having superposed trays therein for carrying seeds and defining a central zone and a peripheral zone, a burner giving off combustion gases rich in carbon dioxide, a heat exchanger, means conveying combustion gases from said burner to said heat exchanger for escape at the latter, a return line from said heat exchanger to the draft of said burner, means for adding fresh air to said return line, and air circulating means effective to propel the gases in said container through said heat exchanger and downwardly through said central zone and then upwardly through said peripheral zone for recirculation through said heat exchanger.

3. Apparatus for the accelerated germination of seeds; comprising a closed container having superposed trays arranged therein in adjacent stacks to carry seeds and define a central zone between the stacks and a peripheral zone at the outer sides of said stacks, a burner, a relatively large diameter conduit extending from the flue of said burner to carry the carbon dioxide rich combustion gases from the latter, a gas circulating system including a housing at the top of said container, a duct depending from said housing through said central zone and opening adjacent the bottom of the latter, return ducts leading from the top of said container to the top of said housing and a ventilating fan in said housing operative to induce a flow of gas downwardly through said duct in the central zone and upwardly through said peripheral zone, a heat exchanger in said housing between said fan and the entrance to said duct, said relatively large conduit carrying combustion gases being connected to said heat exchanger to heat the gases circulated by said fan and to discharge combustion gases for admixing with the circulated gases, a relatively small diameter return conduit extending from said heat exchanger back to the draft of said burner, and means for controlling the flow through said return conduit so that said burner produces a pressure above atmospheric pressure within said container.

References Cited in the file of this patent

UNITED STATES PATENTS

| 989,011 | Hohnbach | Apr. 11, 1911 |
| 1,827,530 | LeGrand | Oct. 13, 1931 |

FOREIGN PATENTS

| 818,712 | France | June 21, 1937 |
| 241,164 | Great Britain | Dec. 31, 1925 |
| 464,853 | Great Britain | 1937 |
| 468,056 | Great Britain | 1937 |

OTHER REFERENCES

Ellis et al.: "Soilless Growth of Plants," 2nd ed., published by Reinhold (N. Y.) 1947, pages 194 and 195.